US012647309B2

(12) United States Patent
Xiao et al.

(10) Patent No.: US 12,647,309 B2
(45) Date of Patent: Jun. 2, 2026

(54) PROBABILISTIC CONSTELLATION SHAPING FOR SLOT AGGREGATION

(71) Applicant: QUALCOMM Incorporated, San Diego, CA (US)

(72) Inventors: Kexin Xiao, Shanghai (CN); Liangming Wu, Beijing (CN); Wei Liu, Beijing (CN); Changlong Xu, Beijing (CN); Hao Xu, Beijing (CN); Hung Dinh Ly, San Diego, CA (US); Kangqi Liu, San Diego, CA (US); Jian Li, Shanghai (CN)

( * ) Notice: Subject to any disclaimer, the term of this patent is extended or adjusted under 35 U.S.C. 154(b) by 64 days.

(21) Appl. No.: 18/855,292

(22) PCT Filed: May 26, 2022

(86) PCT No.: PCT/CN2022/095250
§ 371 (c)(1),
(2) Date: Oct. 8, 2024

(87) PCT Pub. No.: WO2023/225945
PCT Pub. Date: Nov. 30, 2023

(65) Prior Publication Data
US 2025/0247169 A1     Jul. 31, 2025

(51) Int. Cl.
*H04L 27/34*     (2006.01)
*H04L 1/00*     (2006.01)
(Continued)

(52) U.S. Cl.
CPC ............ *H04L 27/34* (2013.01); *H04L 1/0086* (2013.01); *H04L 1/1819* (2013.01); *H04L 1/1835* (2013.01); *H04L 27/0012* (2013.01)

(58) Field of Classification Search
CPC ..... H04L 1/004; H04L 1/0057; H04L 1/0058; H04L 1/1819; H04L 1/1835; H04L 27/0012; H04L 27/34
See application file for complete search history.

(56) References Cited

U.S. PATENT DOCUMENTS

| | | | |
|---|---|---|---|
| 11,277,225 B2 * | 3/2022 | Handte | ............... H04L 27/3405 |
| 2015/0029970 A1 * | 1/2015 | Niewczas | ............. H04L 1/1812 |
| | | | 370/329 |
| 2019/0109752 A1 | 4/2019 | Zhang et al. | |

FOREIGN PATENT DOCUMENTS

| | | |
|---|---|---|
| CN | 111669343 A | 9/2020 |
| WO | 2014060028 A1 | 4/2014 |

(Continued)

OTHER PUBLICATIONS

Xiao et al., On rotated-QAM based probabilistic shaping transmission scheme for Rayleigh fading channels, IEEE, pp. 1 to 5 (Year: 2019).*

(Continued)

*Primary Examiner* — Shelly A Chase

(57) ABSTRACT

Disclosed are systems and techniques for wireless communications. For instance, a network entity may obtain a first plurality of bits from a first buffer, wherein a start position for obtaining the first plurality of bits from the first buffer is based on a redundancy version order. In some cases, the network entity may determine, based on a modulation order and a probability distribution associated with the first plurality of bits, at least one scaling factor for constellation mapping the first plurality of bits. In some examples, the network entity may map, based on the at least one scaling factor, the first plurality of bits to one or more symbols.

30 Claims, 15 Drawing Sheets

1400

Obtain A First Plurality Of Bits From A First Buffer, Wherein A Start Position For Obtaining The First Plurality Of Bits From The First Buffer Is Based On A Redundancy Version Order
1402

Determine, Based On A Modulation Order And A Probability Distribution Associated With The First Plurality Of Bits, At Least One Scaling Factor For Constellation Mapping The First Plurality Of Bits
1404

Map, Based On The At Least One Scaling Factor, The First Plurality Of Bits To One Or More Symbols
1406

(51) Int. Cl.
  *H04L 1/1812*          (2023.01)
  *H04L 1/1829*          (2023.01)
  *H04L 27/00*          (2006.01)

(56)                References Cited

FOREIGN PATENT DOCUMENTS

| WO | 2020108771 | A1 | 6/2020 |
| WO | 2021045854 | A1 | 3/2021 |

OTHER PUBLICATIONS

Steiner et al., Ultra-spare non-binary LDPC codes for Probabilistic amplitude shaping, IEEE, pp. 1 to 5. (Year: 2017).*
International Search Report and Written Opinion—PCT/CN2022/095250—ISA/EPO—Dec. 20, 2022.

* cited by examiner

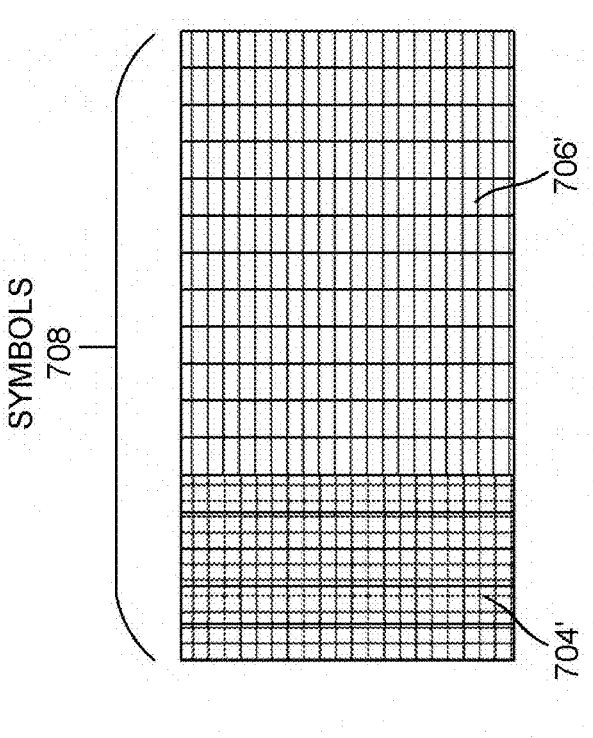
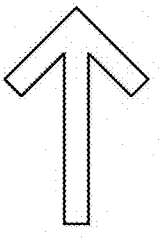
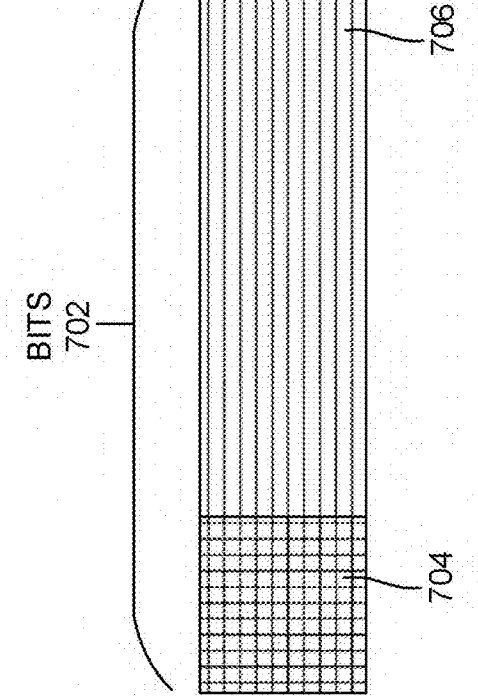
FIG. 7

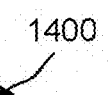

1400

```
┌─────────────────────────────────────────────────┐
│  Obtain A First Plurality Of Bits From A First    │
│  Buffer, Wherein A Start Position For Obtaining   │
│  The First Plurality Of Bits From The First       │
│  Buffer Is Based On A Redundancy Version          │
│  Order                                            │
│                    1402                           │
└─────────────────────────────────────────────────┘
                         │
                         ▼
┌─────────────────────────────────────────────────┐
│  Determine, Based On A Modulation Order And A     │
│  Probability Distribution Associated With The     │
│  First Plurality Of Bits, At Least One Scaling    │
│  Factor For Constellation Mapping The First       │
│  Plurality Of Bits                                │
│                    1404                           │
└─────────────────────────────────────────────────┘
                         │
                         ▼
┌─────────────────────────────────────────────────┐
│  Map, Based On The At Least One Scaling Factor,   │
│  The First Plurality Of Bits To One Or More       │
│  Symbols                                          │
│                    1406                           │
└─────────────────────────────────────────────────┘
```

FIG. 14

PROBABILISTIC CONSTELLATION SHAPING FOR SLOT AGGREGATION

CROSS-REFERENCE TO RELATED APPLICATIONS

This application for Patent is a 371 of international Patent Application PCT/CN2022/095250, filed May 26, 2022, which is hereby incorporated by referenced in its entirety and for all purposes.

FIELD OF THE DISCLOSURE

The present disclosure generally relates to wireless communications. For example, aspects of the present disclosure relate to systems and techniques for implementing probabilistic constellation shaping for slot aggregation.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method for wireless communications is provided. In some aspects, the method may be performed by a network entity (e.g., base station or a component of a disaggregated base station). In some examples, the method may be performed by a user equipment (UE). The method includes: obtaining a first plurality of bits from a first buffer, wherein a start position for obtaining the first plurality of bits from the first buffer is based on a redundancy version order; determining, based on a modulation order and a probability distribution associated with the first plurality of bits, at least one scaling factor for constellation mapping the first plurality of bits; and mapping, based on the at least one scaling factor, the first plurality of bits to one or more symbols.

In another example, an apparatus for wireless communication is provided that includes at least one memory comprising instructions and at least one processor (e.g., implemented in circuitry) configured to execute the instructions and cause the apparatus to: obtain a first plurality of bits from a first buffer, wherein a start position for obtaining the first plurality of bits from the first buffer is based on a redundancy version order; determine, based on a modulation order and a probability distribution associated with the first plurality of bits, at least one scaling factor for constellation mapping the first plurality of bits; and map, based on the at least one scaling factor, the first plurality of bits to one or more symbols.

In another example, a non-transitory computer-readable medium is provided for performing wireless communications, which has stored thereon instructions that, when executed by one or more processors, cause the one or more processors to: obtain a first plurality of bits from a first buffer, wherein a start position for obtaining the first plurality of bits from the first buffer is based on a redundancy version order; determine, based on a modulation order and a probability distribution associated with the first plurality of bits, at least one scaling factor for constellation mapping the first plurality of bits; and map, based on the at least one scaling factor, the first plurality of bits to one or more symbols.

In another example, an apparatus for wireless communications is provided. The apparatus includes: means for obtaining a first plurality of bits from a first buffer, wherein a start position for obtaining the first plurality of bits from the first buffer is based on a redundancy version order; means for determining, based on a modulation order and a probability distribution associated with the first plurality of bits, at least one scaling factor for constellation mapping the first plurality of bits; and means for mapping, based on the at least one scaling factor, the first plurality of bits to one or more symbols.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

FIG. 7 is a diagram illustrating another example of modulation mapping, in accordance with some examples;

FIG. 14 is a flow diagram illustrating an example of a process for performing probabilistic constellation shaping, in accordance with some examples.

DETAILED DESCRIPTION

Figure 1:
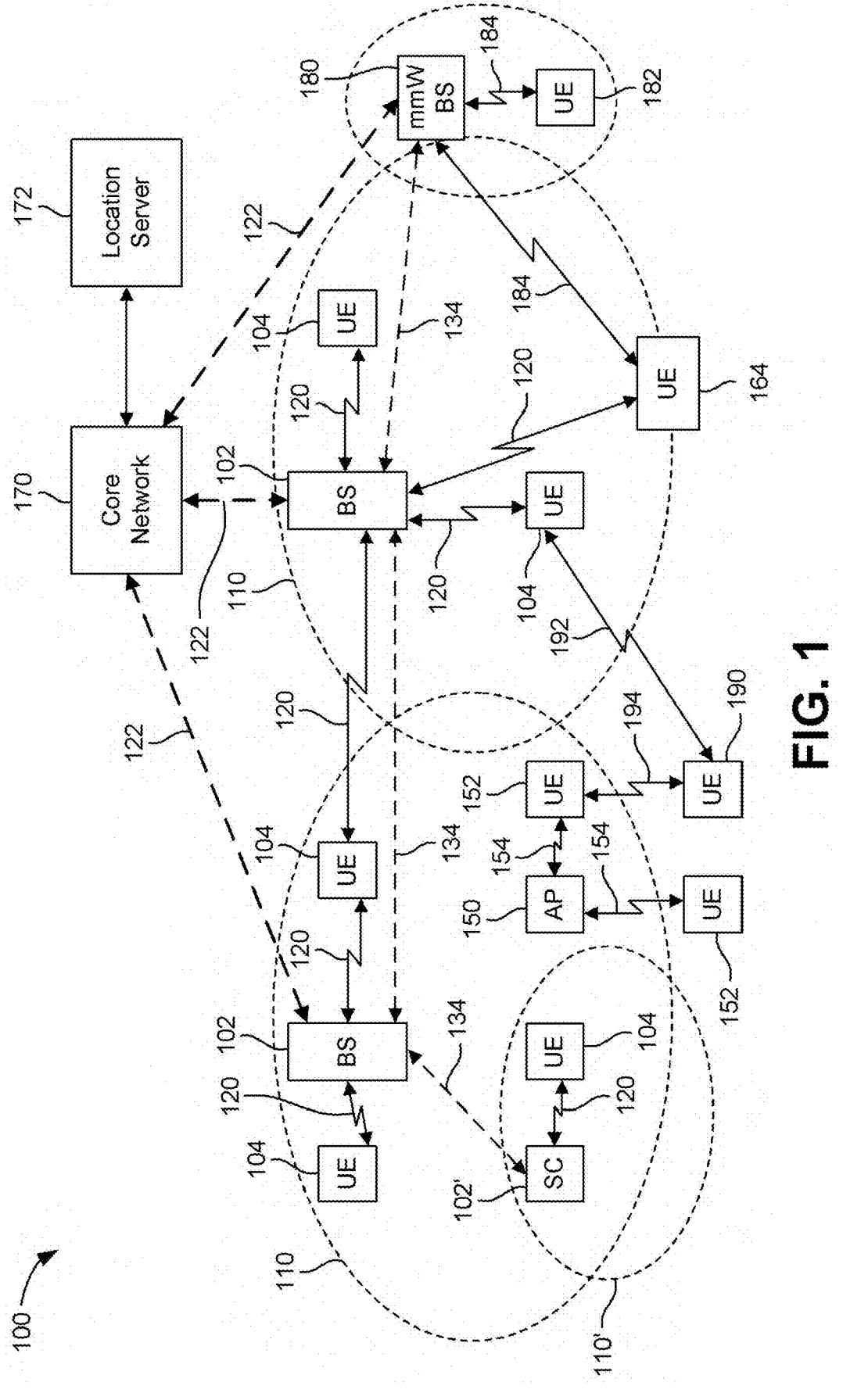
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc. In some cases, the channel capacity or throughput for QAM modulation may be improved by using non-uniformly distributed symbols. For example, a Gaussian distribution of constellation symbols may be used to improve performance (e.g., approach Shannon capacity).

In some cases, a Gaussian distribution of constellation symbols may be achieved by using geometric constellation shaping. In some instances, geometric constellation shaping may yield an equal probability constellation with Gaussian amplitude distribution. In some aspects, a Gaussian distribution of constellation symbols may be achieved by using probabilistic constellation shaping (PCS). In some examples, PCS may yield uniform QAM with non-equal probability of constellation.

In some aspects, slot aggregation may be used to transmit the same transport block across a pre-configured number of consecutive slots. In some cases, configuration for implementing physical downlink shared channel (PDSCH) and/or physical uplink shared channel (PUSCH) aggregation assume the same modulation and coding scheme (MCS) for consecutive slots. For example, a transmitter may sequentially read the coded bits from a data buffer based on a redundancy version. For each redundant version of retransmission, the transmitter may use different start positions (e.g., from the buffer) because the bits are uniformly distributed.

In some cases, a PCS system may cause the systematic bits and the parity check bits to have different probability distributions. In some examples, if the data transmission does not begin with redundancy version 0, the probability distribution of the symbols in transport block repetitions may be different.

Systems, apparatuses, processes (also referred to as methods), and computer-readable media (collectively referred to as "systems and techniques") are described herein for performing probabilistic constellation shaping for slot aggregation. In some aspects, the systems and techniques provide the ability to determine a scaling factor that may be used to perform constellation mapping of non-uniformly distributed information bits (e.g., for amplitude mapping) and uniformly distributed parity check bits (e.g., for sign mapping).

In some cases, the scaling factor may be based on a modulation order and a probability distribution. For example, the modulation order may correspond to 16QAM, 64QAM, 128QAM, and/or any other suitable modulation scheme. In some aspects, the probability distribution may be based on a distribution matching algorithm that may be implemented before encoding information bits (e.g., prior to forward error correction). In some instances, the distribution matching algorithm may include constant composition distribution matching (CCDM), multiset-partition distribution matching (MPDM), sphere shaping, prefix-free code distribution matching (PCDM), and/or any other suitable distribution matching algorithm.

In some aspects, multiple scaling factors may be determined for a group of bits. For example, a first scaling factor may be used to map shaped information bits that are non-uniformly distributed and a second scaling factor may be used to map non-shaped information bits or parity bits that are uniformly distributed. In some cases, the non-uniformly distributed bits may be stored in a first buffer and the uniformly distributed bits may be stored in a second buffer. For example, a modulator may read the uniformly distributed bits (e.g., sign bits) from a circular buffer based on a redundancy version. In some aspects, the modulator may combine the sign bits with the non-uniformly distributed bits (e.g., amplitude bits) obtained from a different buffer. In some examples, the modulator may determine a scaling factor for mapping the uniformly distributed bits and the non-uniformly distributed bits to a group of symbols.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHZ, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
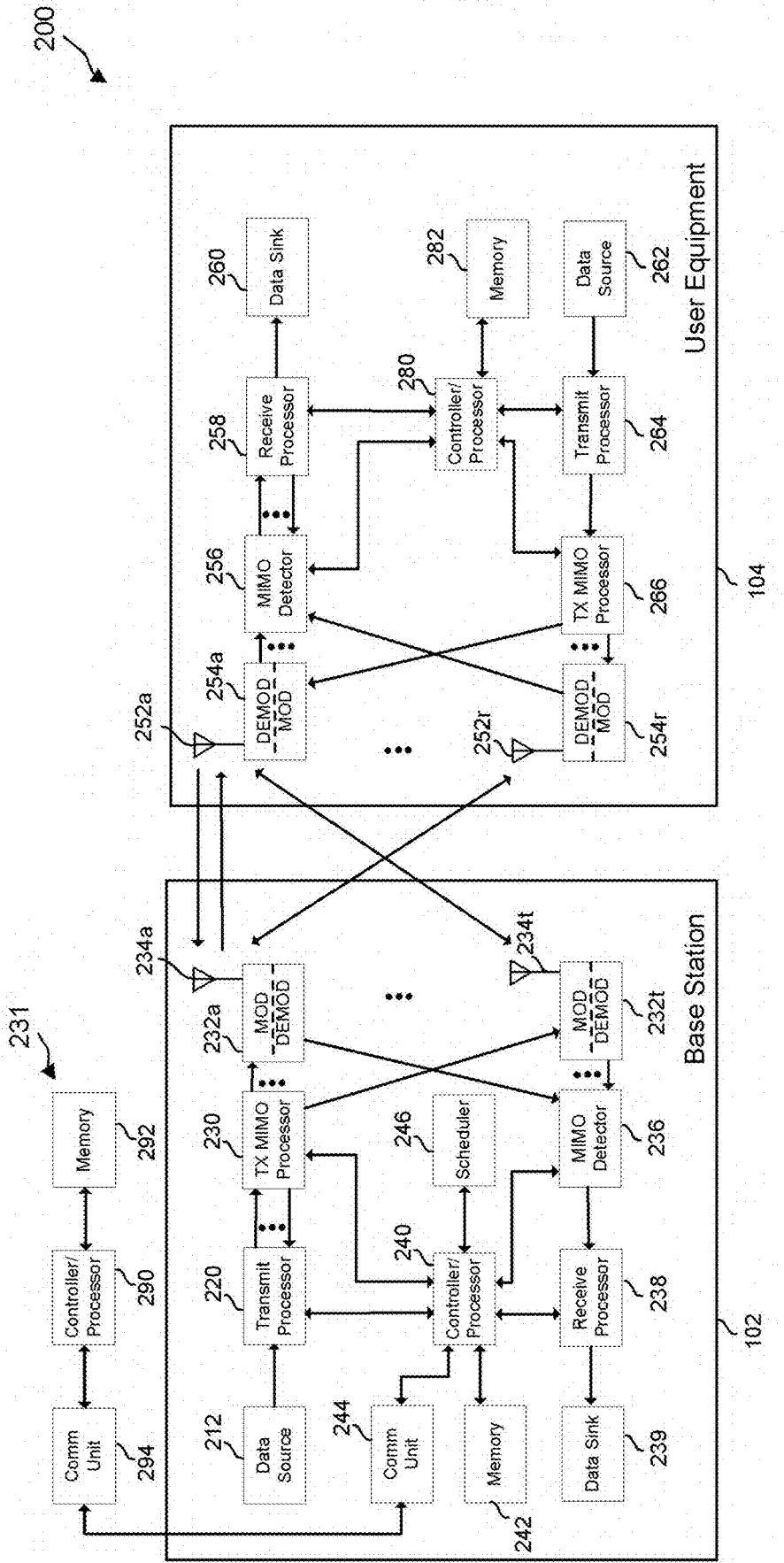
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
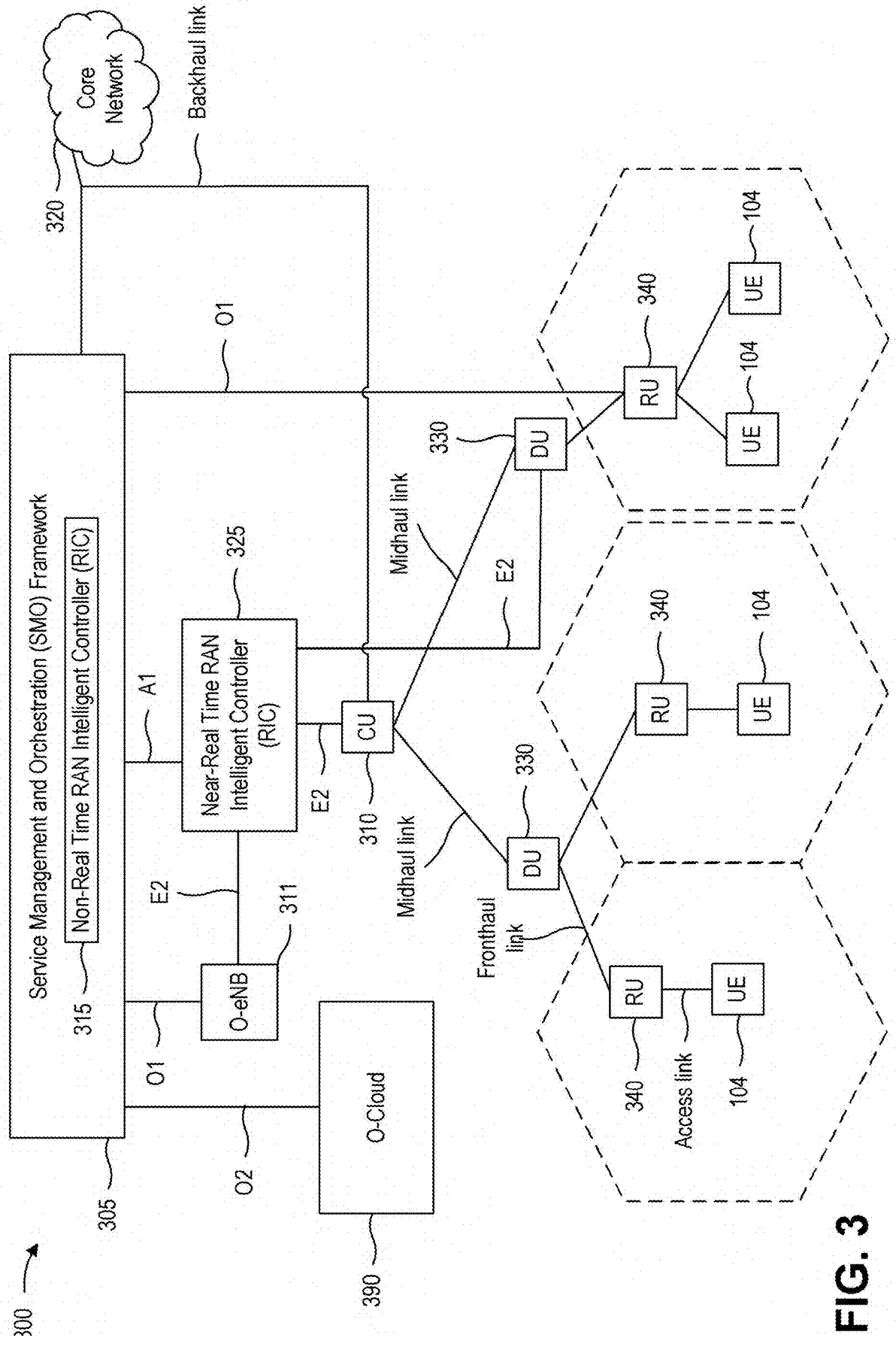
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUS 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
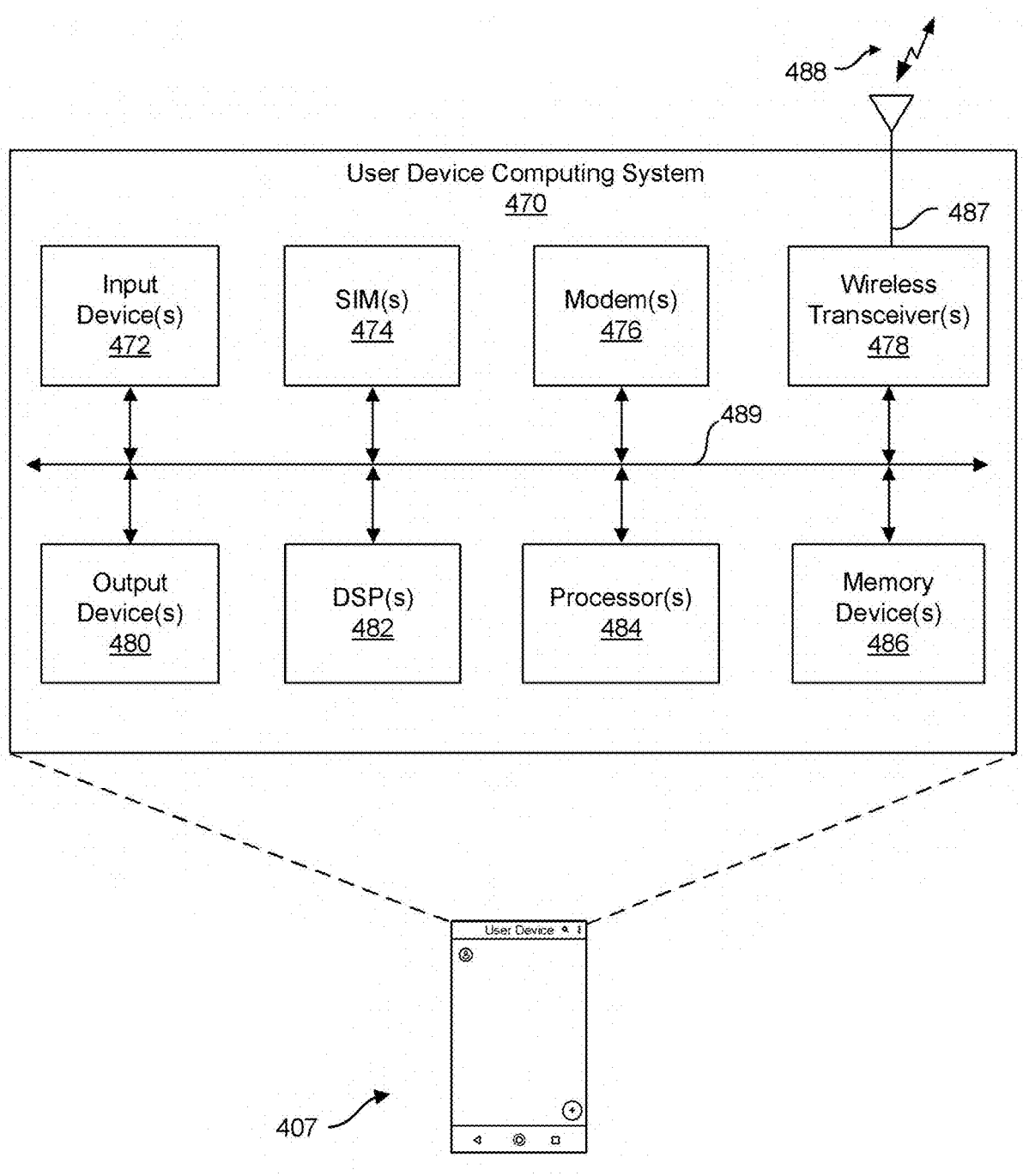
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analogto-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

As noted above, systems and techniques are described herein for performing probabilistic constellation shaping. In some cases, the systems and techniques may be implemented by a network entity or a user equipment (UE). The systems and techniques may be used to determine a scaling factor that may be used perform probabilistic constellation mapping (e.g., mapping of non-uniformly distributed bits). In some aspects, the systems and techniques may be used to perform probabilistic constellation mapping for slot aggregation. For instance, the scaling factor may be used to map bits corresponding to multiple transport blocks having different probability distributions.

Figure 5:
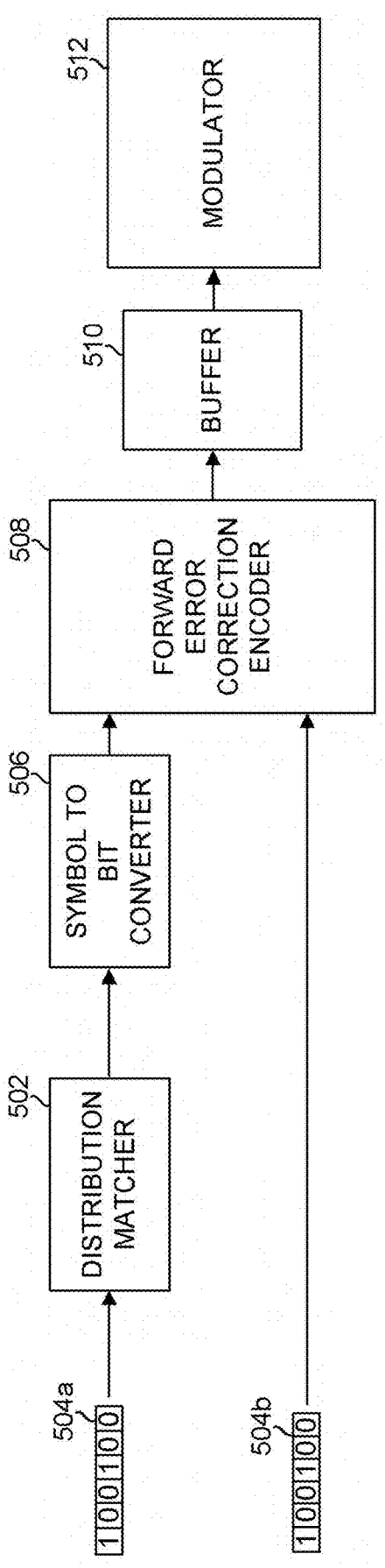
FIG. 5 is a diagram illustrating an example system for implementing probabilistic constellation shaping, in accordance with some examples.

FIG. 5 illustrates an example of a system 500 including components that may be configured to perform probabilistic constellation shaping for slot aggregation. In some aspects, system 500 may be part of a network entity such as a monolithic base station (e.g., base station 102) or a component of a disaggregated base station (e.g., CU 310, DU 330, or RU 340). In some examples, system 500 may be part of a user equipment (UE) such as UE 104 or wireless device 407.

In some aspects, system 500 may include distribution matcher 502. In some cases, distribution matcher 502 may be configured to perform distribution matching on information bits 504a. In some examples, distribution matcher 502 may perform distribution matching using constant composition distribution matching (CCDM), multiset-partition distribution matching (MPDM), sphere shaping, prefix-free code distribution matching (PCDM), and/or any other suitable distribution matching algorithm. In some aspects, distribution matcher 502 may implement overall distribution matching with fixed-to-fixed length (e.g., PCDM with framing methods may be implemented with fixed-to-fixed length). In one illustrative example, distribution matcher 502 may receive input information bits 504a corresponding to a uniformly distributed bit sequence with length "k," and distribution matcher 502 may output a symbol sequence with length "n" having a non-uniform probability distribution with probability mass function "P."

In some examples, system 500 may include symbol to bit converter 506. In some cases, symbol to bit converter 506 may receive an output symbol sequence (e.g., having a non-uniform probability distribution) from distribution matcher 502. In some instances, symbol to bit converter 506 may convert the symbol sequence from distribution matcher 502 into a bit sequence. In some configurations, the bit sequence outputted from symbol to bit converter 506 may correspond to shaped information bits. In some aspects, the shaped information bits may be used for amplitude mapping.

In some cases, the bit sequence (e.g., shaped information bits) outputted from symbol to bit converter 506 may be sent to forward error correction (FEC) encoder 508. In some instances, FEC encoder 508 may also receive non-shaped information bits 504b. In some examples, the non-shaped information bits 504b may be used for sign mapping. In some aspects, FEC encoder 508 may perform low-density parity-check (LDPC) encoding on the shaped information bits (e.g., received from symbol to bit converter 506) and on non-shaped information bits 504b. In some cases, FEC encoder 508 may also generate and append parity bits to the encoded bit sequences. In some examples, the rate of FEC encoder 508 may be determined according to equation (1) below, in which 'm' may correspond to a modulation order (e.g., for 8-ASK, m=3), as follows:

$$\text{Rate}_{FEC} = (m - 1 + \gamma)/m \qquad (1)$$

In some aspects, the output of FEC encoder 508 may include encoded shaped information bits, encoded non-shaped information bits, and/or parity bits. In some cases, the output of FEC encoder 508 may be sent to one or more buffers (e.g., buffer 510). In some aspects, buffer 510 may correspond to a circular buffer. In some examples, buffer 510 may be used to perform rate matching. For example, FEC encoder 508 may fill buffer 510 with a sequence of systematic bits (e.g., shaped information bits and/or non-shaped information bits) and parity bits. In some aspects, modulator 512 may read (e.g., obtain) bits from buffer 510 and perform constellation mapping (e.g., map bits to symbols). In some examples, four redundancy versions (RVs) may be used by modulator 512 to read bits from buffer 510, and the redundancy versions may be denoted as $RV_i$, (e.g., i=0, 1, 2, 3). In some aspects, each RV may be associated with a starting bit $S_i$ location in buffer 510.

In some examples, coded bits may be read out sequentially from buffer 510 starting with bit location $S_i$. In some aspects, one or more of the RVs may be read by modulator 512 based on an RV order. In some instances, the RV order may be indicated by an $RV_{ID}$ that is included in downlink control information (DCI) scheduling sent via a physical downlink control channel (PDCCH). In some configurations, a default RV order (e.g., $RV_{ID}$=0) may correspond to a sequence of RV0, RV2, RV3, and RV1. In some aspects, alternative RV orders may include the following RV sequences: RV2, RV3, RV1, and RV0 (e.g., $RV_{ID}$=2); RV3, RV1, RV0, and RV2 (e.g., $RV_{ID}$=3); and RV1, RV0, RV2, and RV3 (e.g., $RV_{ID}$=1).

In some aspects, modulator 512 may be configured to perform constellation mapping of the bits that are read (e.g., obtained) from buffer 510. In some cases, constellation mapping (e.g., bits to symbols) may be based on a modulation order. For example, in case of 16-quadrature amplitude modulation (QAM), quadruplets of bits, b(4i), b(4i+1), b(4i+2), b(4i+3), may be mapped to complex-valued modulation symbols d(i) according to equation (2) below:

$$d(i) = \frac{1}{\sqrt{10}} \left\{ \begin{array}{l} (1 - 2b(4i))[2 - (1 - 2b(4i + 2))] + \\ j(1 - 2b(4i + 1))[2 - (1 - 2b(4i + 3))] \end{array} \right\} \qquad (2)$$

In another example, in case of 64QAM modulation, hextuplets of bits, b(6i), b(6i+1), b(6i+2), b(6i+3), b(6i+4), b(6i+5), may be mapped to complex-valued modulation symbols d(i) according to equation (3) below:

$$d(i) = \frac{1}{\sqrt{42}} \{(1 - 2b(6i))[4 - (1 - 2b(6i + 2))[2 - (1 - 2b(6i + 4))]] + \qquad (3)$$

$$j(1 - 2b(6i + 1))[4 - (1 - 2b(6i + 3))[2 - (1 - 2b(6i + 5))]]\}$$

In some aspects, modulator 512 may perform modulation mapping based on uniform constellations having an equal probability distribution. For instance, modulator 512 may normalize constellation points based on modulation order (e.g., using equation (2) or equation (3) above). In some examples, modulator 512 may perform probabilistic constellation shaping (PCS). In some cases, a constellation point in PCS may have a different scaling value due to the non-uniform probability distribution of shaped information bits generated by distribution matcher 502. For example, modulator 512 may perform PCS in which a portion of the bits that includes shaped information bits (e.g., from distribution manager 502) that have a non-uniform distribution and may be used for amplitude shaping and another portion of the bits that includes non-shaped information bits and/or parity bits that have a uniform distribution and may be used for sign mapping.

In some cases, modulator 512 may implement PCS by using a scaling factor "A" to perform constellation mapping. In some aspects, the scaling factor 4 may be determined based on the modulation order (e.g., based on the modulation and coding scheme (MCS)) and one or more probability parameters (e.g., the probability distribution and/or the probability mass function). In one illustrative example, the scaling factor $\Delta$ may be determined using equation (4) below, in which x may correspond to the modulation order (e.g., equation (2) for 16QAM or equation (3) for 64QAM) and $E_{x \in x}$ indicates the expectation for all possible constellation point x belonging to X with the desired probability distribution, as follows:

$$E_{x \in X}\left[\|\Delta * x\|^2\right] = 1 \qquad (4)$$

In some aspects, modulator 512 may determine scaling factor $\Delta$ in order to perform PCS for slot aggregation (e.g., for transmitting PDSCH and/or PUSCH in consecutive slots). In some cases, scaling factor $\Delta$ may be used to perform constellation mapping for different RVs that may include bits with uniform or non-uniform distributions. For instance, an RV sequence that does not start from RV0 may result in a different probability distribution for symbols in a transport block (TB) repetition during slot aggregation. In some aspects, modulator 512 may determine the probability distribution and the modulation scaling factor $\Delta$ for transmissions corresponding to different RV start positions.

Figure 6:
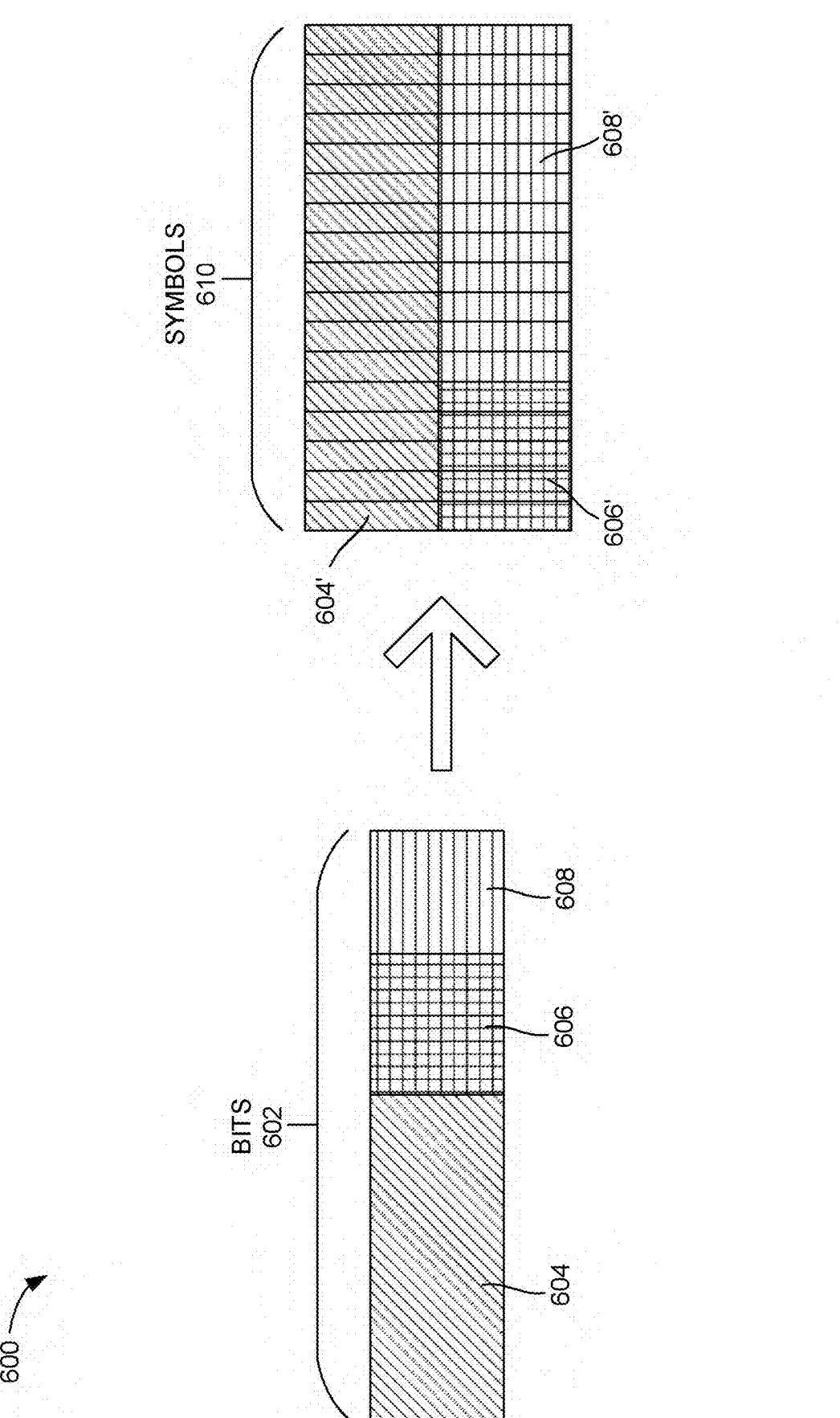
FIG. 6 is a diagram illustrating an example of modulation mapping, in accordance with some examples.

FIG. 6 is an example of a modulation mapping scheme 600 that may be performed by modulator 512. In some aspects, modulator 512 may receive, read, or otherwise obtain bits 602 from buffer 510. In some configurations, bits 602 may correspond to a sequence of bits read from buffer 510 starting with RV0 (e.g., bits 602 may correspond to an RV sequence of RV0, RV2, RV3, and RV1). In some instances, bits 602 may correspond to an initial transmission of a TB while implementing slot aggregation.

In some cases, bits 602 may include shaped information bits 604, non-shaped information bits 606, and parity bits 608. In some examples, shaped information bits 604 may be used for amplitude mapping. In some cases, non-shaped information bits 606 and/or parity bits 608 may be used for sign mapping.

In some aspects, modulator 512 may determine scaling factor $\Delta$ for mapping bits 602 to symbols 610 based on the modulation order and the probability distribution (e.g., using equation (4) above). In some cases, modulator 512 may multiply the modulation mapper by the scaling factor $\Delta$ to map bits 602 to symbols 610. For example, for a 16QAM modulation order, equation (2) may be multiplied by scaling factor $\Delta$ to perform the mapping. In some instances, shaped information bits 604 may correspond to mapped shaped information bits 604' in symbols 610. In some cases, non-shaped information bits 606 may correspond to mapped non-shaped information bits 606' in symbols 610. In some examples, parity bits 608 may correspond to mapped parity bits 608' in symbols 610.

FIG. 7 is an example of a modulation mapping scheme 700 that may be performed by modulator 512. In some aspects, modulator 512 may obtain (e.g., receive or read) bits 702 from buffer 510. In some configurations, bits 702 may correspond to a sequence of bits read from buffer 510 that does not begin with RV0 (e.g., bits 702 may correspond to an RV sequence that starts with RV1, RV2, or RV3).

In some cases, bits 702 may include non-shaped information bits 704 and parity bits 706 (e.g., bits 702 may not include shaped information bits). In some aspects, modulator 512 may determine that bits 702 have a uniform distribution. In some cases, modulator 512 may determine that scaling factor $\Delta$ has a value one based on the uniform distribution of bits 702. In some aspects, modulator 512 may map bits 702 to symbols 708 based on the scaling factor. For example, non-shaped information bits 704 may correspond to mapped non-shaped information bits 704' in symbols 708, and parity bits 706 may correspond to mapped parity bits 706' in symbols 708.

Figure 8:
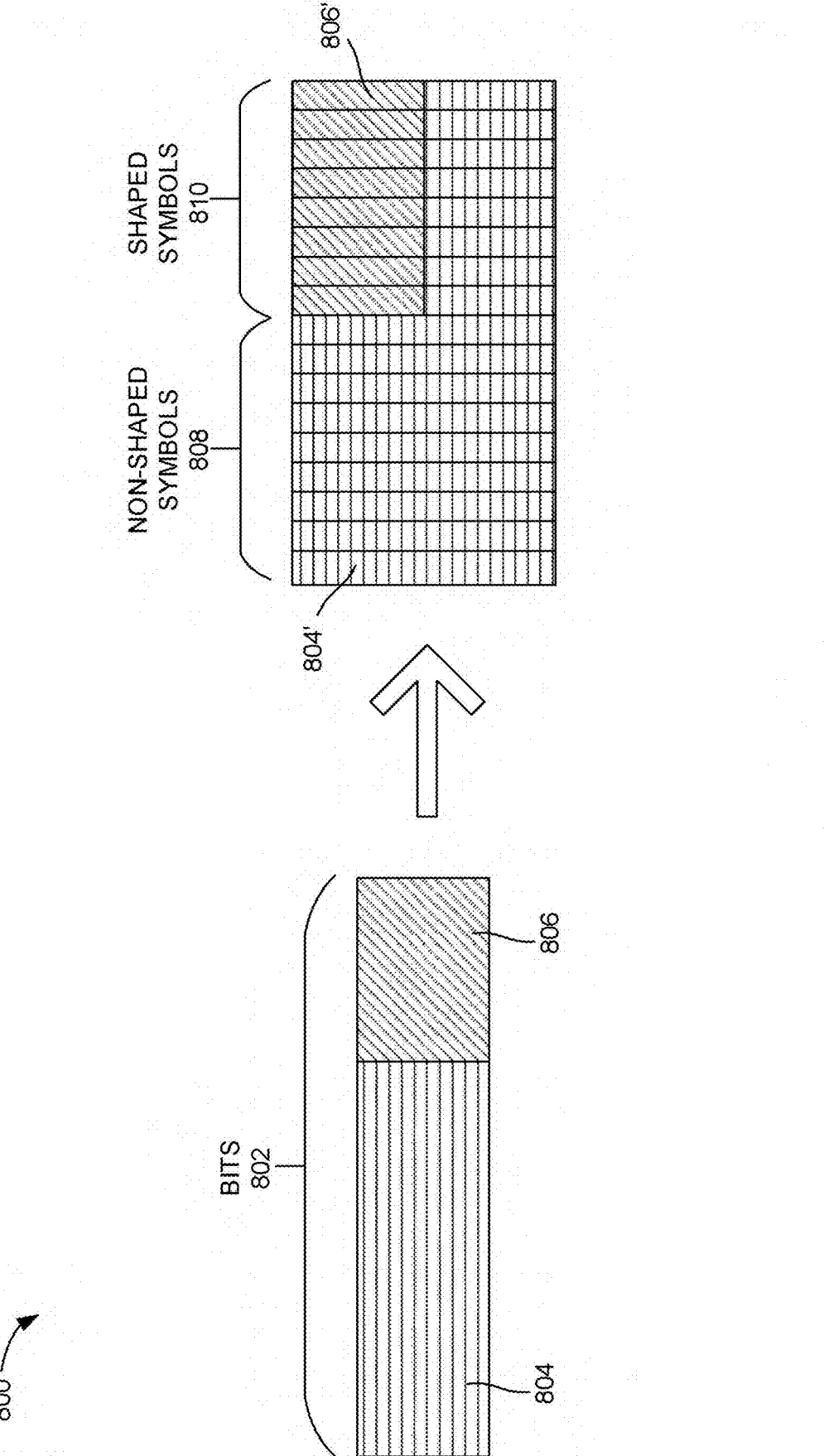
FIG. 8 is a diagram illustrating another example of modulation mapping, in accordance with some examples.

FIG. 8 is an example of a modulation mapping scheme 800 that may be performed by modulator 512. In some aspects, modulator 512 may obtain bits 802 from buffer 510. In some configurations, bits 802 may correspond to a sequence of bits read from buffer 510 that does not begin with RV0 (e.g., bits 802 may correspond to an RV sequence that starts with RV1, RV2, or RV3).

In some cases, bits 802 may include non-shaped information bits and parity bits 804. In some examples, bits 802 may also include shaped information bits 806. In some aspects, modulator 512 may determine two different scaling factors to modulate bits 802. For example, modulator 512 may determine a first scaling factor $\Delta$ that corresponds to non-shaped information bits and parity bits 804. In some cases, modulator 512 may map the non-shaped information bits and parity bits 804 to non-shaped symbols 808 using a scaling factor of one (e.g., based on a uniform distribution). For example, non-shaped information bits and parity bits 804 may correspond to mapped non-shaped information bits and parity bits 804' in non-shaped symbols 808.

In some configurations, modulator 512 may determine a second scaling factor Δ that corresponds to shaped information bits 806. In some cases, modulator 512 may determine the second scaling factor Δ based on the modulation order and the probability distribution (e.g., based on equation (4)). In some aspects, modulator 512 may use the second scaling factor to map shaped information bits 806 to mapped shaped information bits 806' in shaped symbols 810.

Figure 9:
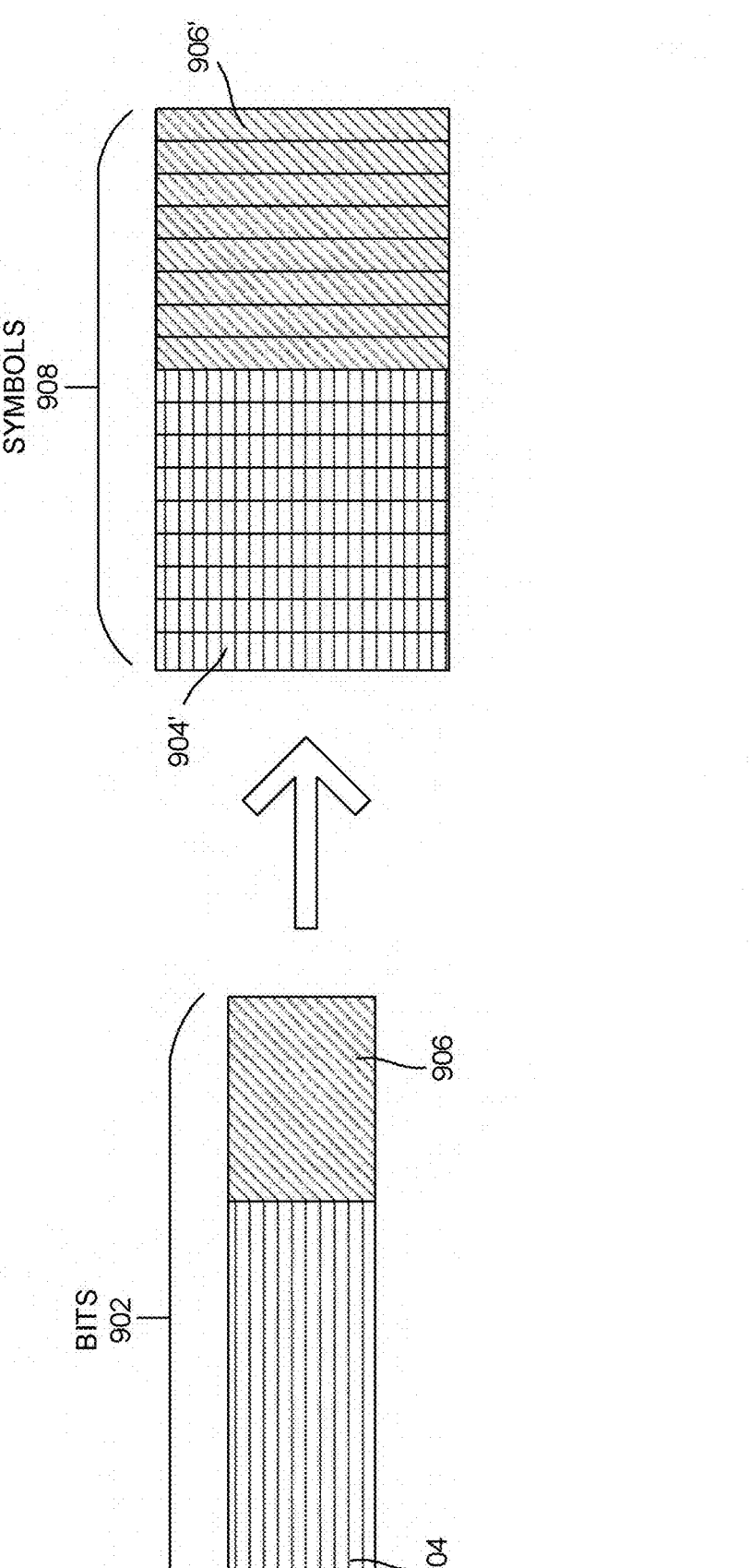
FIG. 9 is a diagram illustrating another example of modulation mapping, in accordance with some examples.

FIG. 9 is an example of a modulation mapping scheme 900 that may be performed by modulator 512. In some aspects, modulator 512 may obtain bits 902 from buffer 510. In some configurations, bits 902 may correspond to a sequence of bits read from buffer 510 that does not begin with RV0 (e.g., bits 902 may correspond to an RV sequence that starts with RV1, RV2, or RV3).

In some cases, bits 902 may include non-shaped information bits and parity bits 904 and shaped information bits 906 (e.g., similar to bits 802 illustrated in FIG. 8). In some aspects, modulator 512 may determine a single scaling factor Δ to modulate bits 902. For instance, modulator 512 may determine that a single scaling factor may be used to map uniformly distributed bits (e.g., non-shaped information and parity bits 904) as well as non-uniformly distributed bits (e.g., shaped information bits 906). In some cases, modulator 512 may determine that the scaling factor is one. For example, modulator 512 may map bits 902 to symbols 908 using a single scaling factor (e.g., scaling factor of 1). In some aspects, non-shaped information bits and parity bits 904 may correspond to mapped non-shaped information bits and parity bits 904' in symbols 908. In some cases, shaped information bits 906 may correspond to mapped shaped bits 906' in symbols 908.

In some examples, modulator 512 may determine whether to use a single scaling factor based on a ratio or a percentage of shaped bits and non-shaped bits within bits 902. For instance, modulator 512 may determine that a percentage of shaped information bits 906 within bits 902 meets or exceeds a threshold value (e.g., 30%) for using a single scaling factor. In some aspects, if the percentage of shaped information bits 906 exceeds that threshold value, modulator 512 may determine separate scaling factors (e.g., as describe in connection with FIG. 8).

Returning to FIG. 5, in some aspects, buffer 510 may include multiple buffers. In some cases, a first buffer may be configured to include non-shaped information bits and parity bits (e.g., used for sign bits) and a second buffer may be configured to include shaped information bits. In some examples, separate buffers may be used to maintain the same or similar probability distribution of different transport block repetitions (e.g., during slot aggregation) while realizing throughput gains due to PCS (e.g., shaping gain).

In some configurations, modulator 512 may read bits from the first buffer that includes non-shaped information according to the RV sequence. In some aspects, modulator 512 may combine the sign bits from the first buffer with the shaped bits from the second buffer. In some cases, the scaling factor Δ for modulating the bits may be the same for TB repetitions within the slog aggregation. In some examples, the scaling factor may be derived based on the probability distribution and the modulation order.

Figure 10:
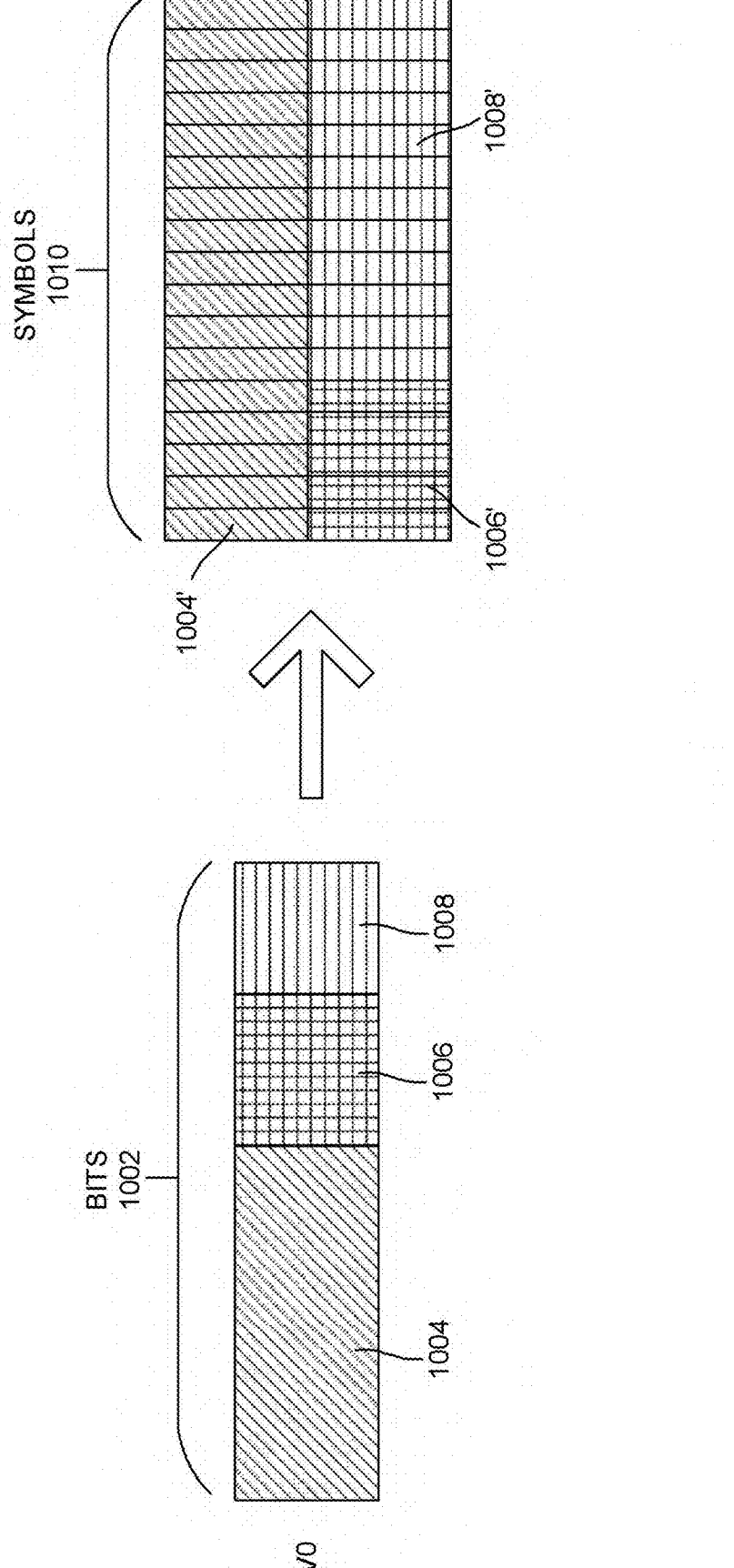
FIG. 10 is a diagram illustrating another example of modulation mapping, in accordance with some examples.

FIG. 10 is an example of a modulation mapping scheme 1000 that may be performed by modulator 512. In some aspects, modulator 512 may obtain bits 1002 from two or more buffers. In some configurations, shaped information bits 1004 may be obtained from a first buffer. In some examples, non-shaped information bits 1006 and parity bits 1008 may be obtained from a second buffer based on a redundancy version (e.g., RV0). In some aspects, modulator 512 may determine a scaling factor in order to map bits 1002 to symbols 1010. For example, shaped information bits 1004 may correspond to mapped shaped information bits 1004' in symbols 1010. In some cases, non-shaped information bits 1006 may correspond to mapped non-shaped information bits 1006' in symbols 1010. In some instances, parity bits 1008 may correspond to mapped parity bits 1008' in symbols 1010.

Figure 11:
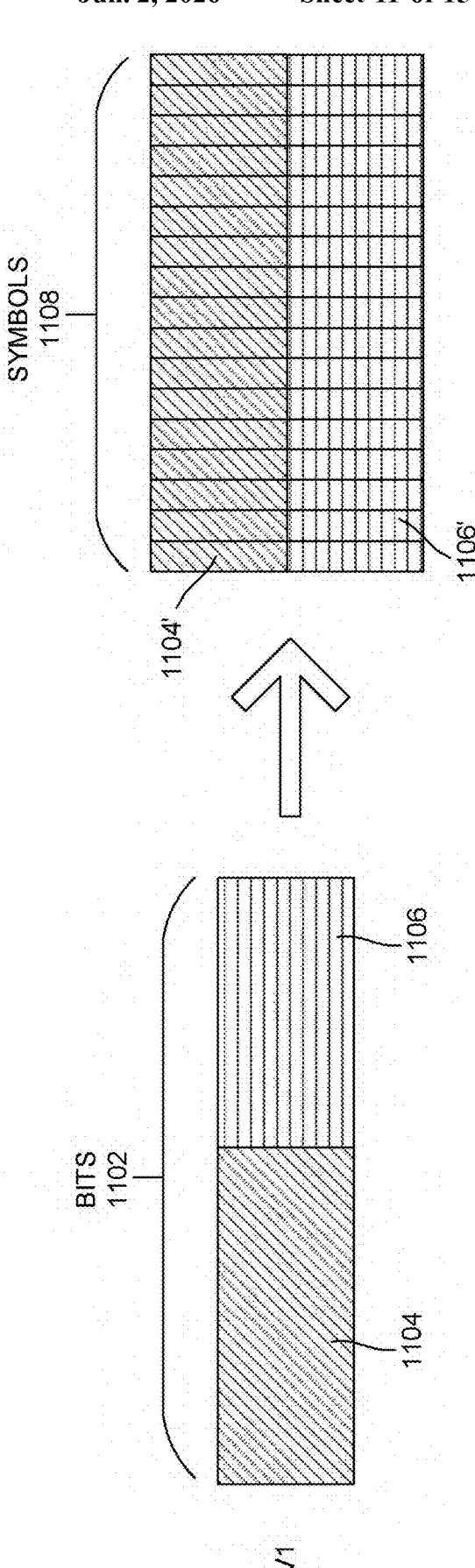
FIG. 11 is a diagram illustrating another example of modulation mapping, in accordance with some examples.

FIG. 11 is an example of a modulation mapping scheme 1100 that may be performed by modulator 512. In some aspects, modulator 512 may obtain bits 1102 from two or more buffers. In some configurations, shaped information bits 1104 may be obtained from a first buffer. In some examples, parity bits 1106 may be obtained from a second buffer (e.g., based on a redundancy version such as RV1). In some aspects, modulator 512 may determine a scaling factor in order to map bits 1102 to symbols 1108. In some cases, shaped information bits 1104 may correspond to mapped shaped information bits 1104' in symbols 1108. In some instances, parity bits 1106 may correspond to mapped parity bits 1106' in symbols 1108.

Figure 12:
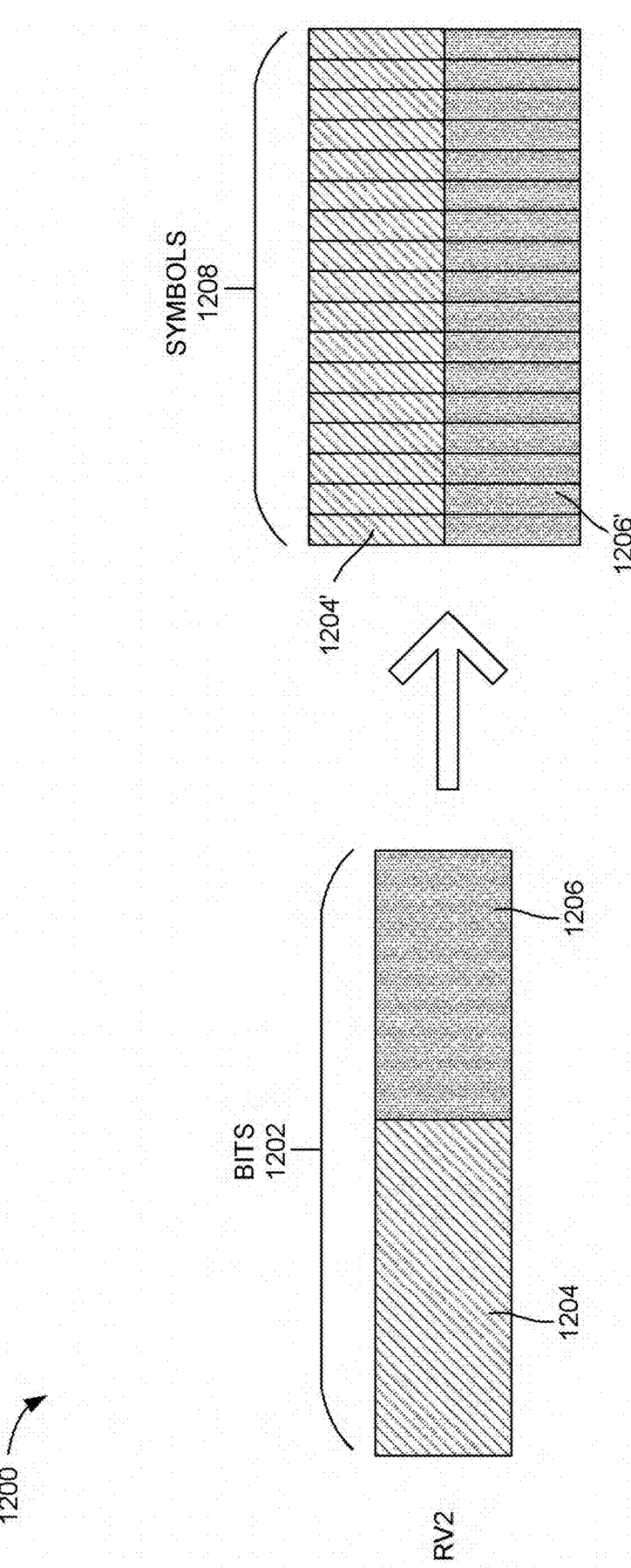
FIG. 12 is a diagram illustrating another example of modulation mapping, in accordance with some examples.

FIG. 12 is an example of a modulation mapping scheme 1200 that may be performed by modulator 512. In some aspects, modulator 512 may obtain bits 1202 from two or more buffers. In some configurations, shaped information bits 1204 may be obtained from a first buffer. In some examples, parity bits 1206 may be obtained from a second buffer (e.g., based on a redundancy version such as RV2). In some aspects, modulator 512 may determine a scaling factor in order to map bits 1202 to symbols 1208. In some cases, shaped information bits 1204 may correspond to mapped shaped information bits 1204' in symbols 1208. In some instances, parity bits 1206 may correspond to mapped parity bits 1206' in symbols 1208.

Figure 13:
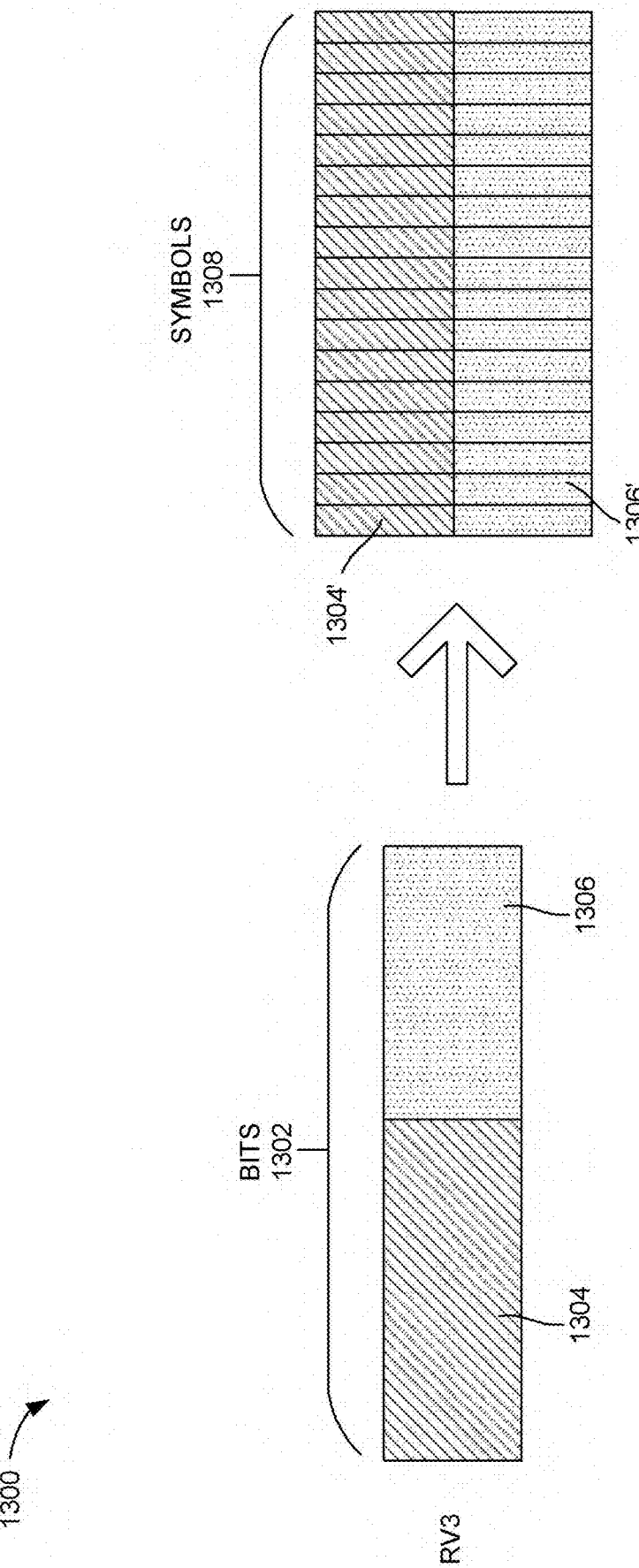
FIG. 13 is a diagram illustrating another example of modulation mapping, in accordance with some examples.

FIG. 13 is an example of a modulation mapping scheme 1300 that may be performed by modulator 512. In some aspects, modulator 512 may obtain bits 1302 from two or more buffers. In some configurations, shaped information bits 1304 may be obtained from a first buffer. In some examples, parity bits 1306 may be obtained from a second buffer (e.g., based on a redundancy version such as RV3). In some aspects, modulator 512 may determine a scaling factor in order to map bits 1302 to symbols 1308. In some cases, shaped information bits 1304 may correspond to mapped shaped information bits 1304' in symbols 1308. In some instances, parity bits 1306 may correspond to mapped parity bits 1306' in symbols 1308.

FIG. 14 is a flowchart diagram illustrating an example of a process 1400 for performing probabilistic constellation shaping. At block 1402, the process 1400 includes obtaining a first plurality of bits from a first buffer, wherein a start position for obtaining the first plurality of bits from the first buffer is based on a redundancy version order. For example, modulator 512 may obtain a first plurality of bits from buffer 510. In some aspects, the start position for reading the first plurality of bits from buffer 510 may be based on a redundancy version order.

At block 1404, the process 1400 includes determining, based on a modulation order and a probability distribution associated with the first plurality of bits, at least one scaling factor for constellation mapping the first plurality of bits. For example, modulator 512 may determine at least one scaling factor for constellation mapping the plurality of bits based on a modulation order and a probability distribution. In some aspects, the probability distribution may be based on at least one of constant composition distribution matching (CCDM), multiset-partition distribution matching (MPDM), sphere shaping, and prefix-free code distribution matching (PCDM). In some examples, the modulation order may include at least one of 16-quadrature amplitude modulation (QAM), 64-QAM, and 256-QAM.

At block 1406, the process 1400 includes mapping, based on the at least one scaling factor, the first plurality of bits to one or more symbols. For instance, modulator 512 may map the first plurality of bits to one or more symbols. In one illustrative example, modulator 512 may map bits 1002 to symbols 1010 based on the at least one scaling factor.

In some aspects, the process 1400 may include determining, based on the redundancy version order, that the start position for obtaining the first plurality of bits from the first buffer corresponds to an intermediate position in the first buffer. For instance, modulator 512 may determine that the start position for obtaining data from buffer 510 corresponds to an intermediate position in buffer 510 (e.g., based on an RV order the begins with RV1, RV2, or RV3).

In some examples, the process 1400 may include determining that the at least one scaling factor has a value of one in response to determining that the first plurality of bits obtained from the intermediate position in the first buffer only includes non-shaped information bits and parity bits. For instance, as illustrated in FIG. 7, modulator 512 may determine that the first plurality of bits only includes non-shaped information bits and parity bits (e.g., bits having a uniform distribution) and in response, may determine that the scaling factor has a value of one.

In some aspects, the process 1400 may include determining that the first plurality of bits obtained from the intermediate position includes shaped information bits, non-shaped information bits, and parity bits, wherein the at least one scaling factor includes a first scaling factor and a second scaling factor; determining the first scaling factor for constellation mapping the shaped information bits; and determining the second scaling factor for constellation mapping the non-shaped information bits and the parity bits. For example, modulator 512 may determine that the first plurality of bits (e.g., bits 802) includes shaped information bits, non-shaped information bits, and parity bits. In some cases, modulator 512 may determine a first scaling factor for constellation mapping the shaped information bits (e.g., shaped information bits 806) and a second scaling factor for constellation mapping the non-shaped information bits and the parity bits (e.g., bits 804). In some examples, the first scaling factor and the second scaling factor may be equivalent. For example, modulator 512 may determine that a single scaling factor may be used to map shaped information symbols and non-shaped information symbols (e.g., modulator 512 may map bits 902 to symbols 908 using scaling factor of one).

In some aspects, the process 1400 may include obtaining a second plurality of bits from a second buffer, wherein the second plurality of bits includes shaped information bits, and the first plurality of bits includes non-shaped information bits and parity bits. In some examples, the process 1400 may also include determining, based on the modulation order and a second probability distribution associated with the second plurality of bits, a second scaling factor for constellation mapping the second plurality of bits and mapping, based on the second scaling factor, the second plurality of bits to the one or more symbols. For instance, modulator 512 may obtain a second plurality of bits from a second buffer that includes shaped information bits while the first plurality of bits includes non-shaped information bits and parity bits. In some aspects, modulator 512 may determine a second scaling factor based on the modulation order and a second probability distribution associated with the second plurality of bits. In some cases, modulator 512 may map the second plurality of bits to the one or more symbols based on the second scaling factor.

In some aspects in which the process 1400 is performed by a network entity, the process 1400 may include transmitting at least one of the modulation order, the probability distribution, and the at least one scaling factor to one or more user equipments (UEs). For example, base station 102 may transmit the modulation and coding scheme (MCS), the probability parameters and/or the scaling factor to UE 104. In some aspects in which the process 1400 is performed by a UE, the process 1400 may include receiving at least one of the modulation order, the probability distribution, and the at least one scaling factor from a base station. For instance, UE 104 may receive the modulation and coding scheme (MCS), the probability parameters and/or the at least one scaling factor from base station 102. In some cases, the at least one scaling factor may be indicated using radio resource control (RRC) protocol or downlink control information (DCI). In some aspects, a UE (e.g., UE 104) may derive the at least one scaling factor based on the MCS and the probability parameters.

In some examples, the processes described herein (e.g., process 1400 and/or other process described herein) may be performed by a computing device or apparatus (e.g., a UE or a base station). In one example, the process 1400 may be performed by the base station 102 of FIG. 2, the RU 340 of FIG. 3, the DU 330 of FIG. 3, and/or the CU 310 of FIG. 3. In another example, the process 1400 may be performed by the UE 104 of FIG. 2. In another example, the process 1400 may be performed by a computing device with the computing system 1500 shown in FIG. 15.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, neural processing units (NPUs), graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1400 is illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 1400 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
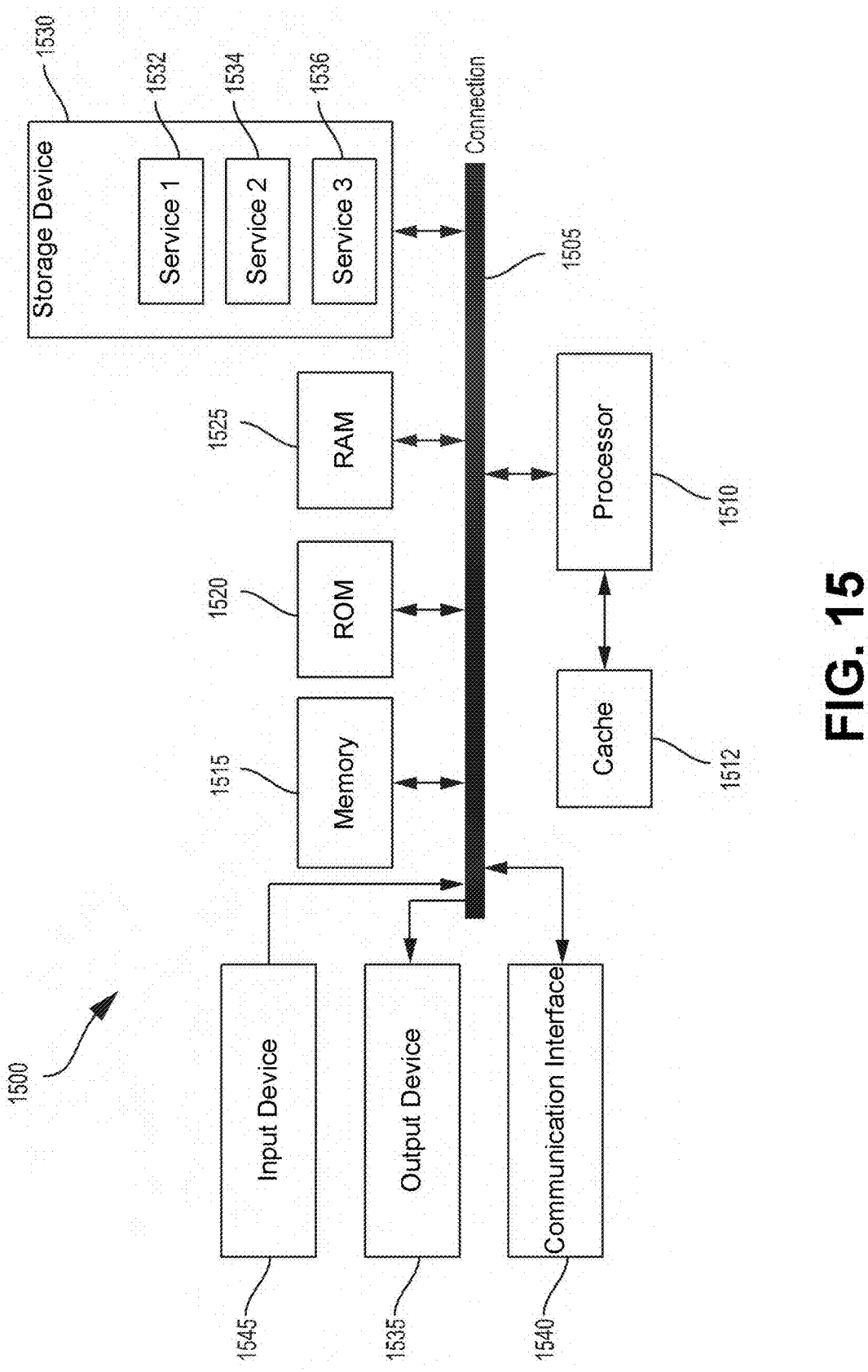
FIG. 15 is a block diagram illustrating an example of a computing system, in accordance with some examples.

FIG. 15 is a diagram illustrating an example of a system for implementing certain aspects of the present technology. In particular, FIG. 15 illustrates an example of computing system 1500, which may be for example any computing device making up internal computing system, a remote computing system, a camera, or any component thereof in which the components of the system are in communication with each other using connection 1505. Connection 1505 may be a physical connection using a bus, or a direct connection into processor 1510, such as in a chipset architecture. Connection 1505 may also be a virtual connection, networked connection, or logical connection.

In some embodiments, computing system 1500 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 may include a cache 1512 of high-speed memory connected directly with, in close proximity to, or integrated as part of processor 1510.

Processor 1510 may include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which may represent any number of input mechanisms, such as a microphone for speech, a touch-sensitive screen for gesture or graphical input, keyboard, mouse, motion input, speech, etc. Computing system 1500 may also include output device 1535, which may be one or more of a number of output mechanisms. In some instances, multimodal systems may enable a user to provide multiple types of input/output to communicate with computing system 1500.

Computing system 1500 may include communications interface 1540, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 may include software services, servers, services, etc., that when the code that defines such software is executed by the processor 1510, it causes the system to perform a function. In some embodiments, a hardware service that performs a particular function may include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A method for wireless communications performed at a network entity, comprising: obtaining a first plurality of bits from a first buffer, wherein a start position for obtaining the first plurality of bits from the first buffer is based on a redundancy version order; determining, based on a modulation order and a probability distribution associated with the first plurality of bits, at least one scaling factor for constellation mapping the first plurality of bits; and mapping, based on the at least one scaling factor, the first plurality of bits to one or more symbols.

Aspect 2. The method of Aspect 1, further comprising: determining, based on the redundancy version order, that the start position for obtaining the first plurality of bits from the first buffer corresponds to an intermediate position in the first buffer.

Aspect 3. The method of Aspect 2, further comprising: in response to determining that the first plurality of bits obtained from the intermediate position only includes non-shaped information bits and parity bits, determining that the at least one scaling factor has a value of one.

Aspect 4. The method of Aspect 2, further comprising: determining that the first plurality of bits obtained from the intermediate position includes shaped information bits, non-shaped information bits, and parity bits, wherein the at least one scaling factor includes a first scaling factor and a second scaling factor; determining the first scaling factor for constellation mapping the shaped information bits; and determining the second scaling factor for constellation mapping the non-shaped information bits and the parity bits.

Aspect 5. The method of Aspect 4, wherein the first scaling factor and the second scaling factor are equivalent.

Aspect 6. The method of any of Aspects 1 to 5, further comprising: obtaining a second plurality of bits from a second buffer, wherein the second plurality of bits includes shaped information bits, and the first plurality of bits includes non-shaped information bits and parity bits; determining, based on the modulation order and a second probability distribution associated with the second plurality of bits, a second scaling factor for constellation mapping the second plurality of bits; and mapping, based on the second scaling factor, the second plurality of bits to the one or more symbols.

Aspect 7. The method of any of Aspects 1 to 6, further comprising: transmitting at least one of the modulation order, the probability distribution, and the at least one scaling factor to one or more user equipments (UEs).

Aspect 8. The method of any of Aspects 1 to 7, wherein the probability distribution is based on at least one of constant composition distribution matching (CCDM), multiset-partition distribution matching (MPDM), sphere shaping, and prefix-free code distribution matching (PCDM).

Aspect 9. The method of any of Aspects 1 to 8, wherein the modulation order includes at least one of 16-quadrature amplitude modulation (QAM), 64-QAM, and 256-QAM.

Aspect 10. An apparatus for wireless communications, comprising: at least one memory; and at least one processor coupled to the at least one memory, wherein the at least one processor is configured to perform operations in accordance with any one of Aspects 1-9.

Aspect 11. An apparatus for wireless communications, comprising means for performing operations in accordance with any one of Aspects 1 to 9.

Aspect 12: A non-transitory computer-readable medium comprising instructions that, when executed by an apparatus, cause the apparatus to perform operations in accordance with any one of Aspects 1 to 9.

Aspect 13. A method for wireless communications performed at a user equipment (UE), comprising: obtaining a first plurality of bits from a first buffer, wherein a start position for obtaining the first plurality of bits from the first buffer is based on a redundancy version order; determining, based on a modulation order and a probability distribution associated with the first plurality of bits, at least one scaling factor for constellation mapping the first plurality of bits; and mapping, based on the at least one scaling factor, the first plurality of bits to one or more symbols.

Aspect 14. The method of Aspect 14, further comprising: determining, based on the redundancy version order, that the start position for obtaining the first plurality of bits from the first buffer corresponds to an intermediate position in the first buffer.

Aspect 15. The method of Aspect 14, further comprising: in response to determining that the first plurality of bits obtained from the intermediate position only includes non-shaped information bits and parity bits, determining that the at least one scaling factor has a value of one.

Aspect 16. The method of Aspect 14, further comprising: determining that the first plurality of bits obtained from the intermediate position includes shaped information bits, non-shaped information bits, and parity bits, wherein the at least one scaling factor includes a first scaling factor and a second scaling factor; determining the first scaling factor for constellation mapping the shaped information bits; and determining the second scaling factor for constellation mapping the non-shaped information bits and the parity bits.

Aspect 17. The method of Aspect 16, wherein the first scaling factor and the second scaling factor are equivalent.

Aspect 18. The method of any of Aspects 13 to 17, further comprising: obtaining a second plurality of bits from a second buffer, wherein the second plurality of bits includes shaped information bits, and the first plurality of bits includes non-shaped information bits and parity bits; determining, based on the modulation order and a second probability distribution associated with the second plurality of bits, a second scaling factor for constellation mapping the second plurality of bits; and mapping, based on the second scaling factor, the second plurality of bits to the one or more symbols.

Aspect 19. The method of any of Aspects 13 to 18, further comprising: receiving at least one of the modulation order, the probability distribution, and the at least one scaling factor from a network entity.

Aspect 20. The method of any of Aspects 13 to 19, wherein the probability distribution is based on at least one of constant composition distribution matching (CCDM), multiset-partition distribution matching (MPDM), sphere shaping, and prefix-free code distribution matching (PCDM).

Aspect 21. The method of any of Aspects 13 to 20, wherein the modulation order includes at least one of 16-quadrature amplitude modulation (QAM), 64-QAM, and 256-QAM.

Aspect 22. An apparatus for wireless communications, comprising: at least one memory; and at least one processor coupled to the at least one memory, wherein the at least one processor is configured to perform operations in accordance with any one of Aspects 13-21.

Aspect 23. An apparatus for wireless communications, comprising means for performing operations in accordance with any one of Aspects 13 to 21.

Aspect 24: A non-transitory computer-readable medium comprising instructions that, when executed by an apparatus, cause the apparatus to perform operations in accordance with any one of Aspects 13 to 21.

What is claimed is:
1. A method for wireless communications performed at a network entity, comprising:
   obtaining a first plurality of bits from a first buffer, wherein a start position for obtaining the first plurality of bits from the first buffer is based on a redundancy version order;

determining, based on a modulation order and a probability distribution associated with the first plurality of bits, at least one scaling factor for constellation mapping the first plurality of bits; and mapping, based on the at least one scaling factor, the first plurality of bits to one or more symbols.

2. The method of claim 1, further comprising:

determining, based on the redundancy version order, that the start position for obtaining the first plurality of bits from the first buffer corresponds to an intermediate position in the first buffer.

3. The method of claim 2, further comprising:

in response to determining that the first plurality of bits only includes non-shaped information bits and parity bits, determining that the at least one scaling factor has a value of one.

4. The method of claim 2, further comprising:

determining that the first plurality of bits includes shaped information bits, non-shaped information bits, and parity bits, wherein the at least one scaling factor includes a first scaling factor and a second scaling factor;

determining the first scaling factor for constellation mapping the shaped information bits; and determining the second scaling factor for constellation mapping the non-shaped information bits and the parity bits.

5. The method of claim 4, wherein the first scaling factor and the second scaling factor are equivalent.

6. The method of claim 1, further comprising:

obtaining a second plurality of bits from a second buffer, wherein the second plurality of bits includes shaped information bits, and the first plurality of bits includes non-shaped information bits and parity bits;

determining, based on the modulation order and a second probability distribution associated with the second plurality of bits, a second scaling factor for constellation mapping the second plurality of bits; and mapping, based on the second scaling factor, the second plurality of bits to the one or more symbols.

7. The method of claim 1, further comprising:

transmitting at least one of the modulation order, the probability distribution, and the at least one scaling factor to one or more user equipments (UEs).

8. The method of claim 1, wherein the probability distribution is based on at least one of constant composition distribution matching (CCDM), multiset-partition distribution matching (MPDM), sphere shaping, and prefix-free code distribution matching (PCDM).

9. The method of claim 1, wherein the modulation order includes at least one of 16-quadrature amplitude modulation (QAM), 64-QAM, and 256-QAM.

10. An apparatus for wireless communications, comprising:

at least one memory comprising instructions; and at least one processor configured to execute the instructions and cause the apparatus to:

obtain a first plurality of bits from a first buffer, wherein a start position for obtaining the first plurality of bits from the first buffer is based on a redundancy version order;

determine, based on a modulation order and a probability distribution associated with the first plurality of bits, at least one scaling factor for constellation mapping the first plurality of bits; and map, based on the at least one scaling factor, the first plurality of bits to one or more symbols.

11. The apparatus of claim 10, wherein the at least one processor is further configured to cause the apparatus to:

determine, based on the redundancy version order, that the start position for obtaining the first plurality of bits from the first buffer corresponds to an intermediate position in the first buffer.

12. The apparatus of claim 11, wherein the at least one processor is further configured to cause the apparatus to:

determine that the first plurality of bits only includes non-shaped information bits and parity bits; and in response, determine that the at least one scaling factor has a value of one.

13. The apparatus of claim 11, wherein the at least one processor is further configured to cause the apparatus to:

determine that the first plurality of bits includes shaped information bits, non-shaped information bits, and parity bits, wherein the at least one scaling factor includes a first scaling factor and a second scaling factor;

determine the first scaling factor for constellation mapping the shaped information bits; and determine the second scaling factor for constellation mapping the non-shaped information bits and the parity bits.

14. The apparatus of claim 13, wherein the first scaling factor and the second scaling factor are equivalent.

15. The apparatus of claim 10, wherein the at least one processor is further configured to cause the apparatus to:

obtain a second plurality of bits from a second buffer, wherein the second plurality of bits includes shaped information bits, and the first plurality of bits includes non-shaped information bits and parity bits;

determine, based on the modulation order and a second probability distribution associated with the second plurality of bits, a second scaling factor for constellation mapping the second plurality of bits; and map, based on the second scaling factor, the second plurality of bits to the one or more symbols.

16. The apparatus of claim 10, further comprising:

transmit at least one of the modulation order, the probability distribution, and the at least one scaling factor to one or more user equipments (UEs), wherein the apparatus is configured as a network entity.

17. The apparatus of claim 10, further comprising:

receive at least one of the modulation order, the probability distribution, and the at least one scaling factor from a network entity, wherein the apparatus is configured as a user equipment (UE).

18. The apparatus of claim 10, wherein the probability distribution is based on at least one of constant composition distribution matching (CCDM), multiset-partition distribution matching (MPDM), sphere shaping, and prefix-free code distribution matching (PCDM).

19. The apparatus of claim 10, wherein the modulation order includes at least one of 16-quadrature amplitude modulation (QAM), 64-QAM, and 256-QAM.

20. A method for wireless communications performed at a user equipment (UE), comprising:

obtaining a first plurality of bits from a first buffer, wherein a start position for obtaining the first plurality of bits from the first buffer is based on a redundancy version order;

determining, based on a modulation order and a probability distribution associated with the first plurality of bits, at least one scaling factor for constellation mapping the first plurality of bits; and mapping, based on the at least one scaling factor, the first plurality of bits to one or more symbols.

21. The method of claim 20, further comprising:

determining, based on the redundancy version order, that the start position for obtaining the first plurality of bits from the first buffer corresponds to an intermediate position in the first buffer.

22. The method of claim 21, further comprising:

in response to determining that the first plurality of bits only includes non-shaped information bits and parity bits, determining that the at least one scaling factor has a value of one.

23. The method of claim 21, further comprising:

determining that the first plurality of bits includes shaped information bits, non-shaped information bits, and parity bits, wherein the at least one scaling factor includes a first scaling factor and a second scaling factor;

determining the first scaling factor for constellation mapping the shaped information bits; and determining the second scaling factor for constellation mapping the non-shaped information bits and the parity bits.

24. The method of claim 23, wherein the first scaling factor and the second scaling factor are equivalent.

25. The method of claim 20, further comprising:

obtaining a second plurality of bits from a second buffer, wherein the second plurality of bits includes shaped information bits, and the first plurality of bits includes non-shaped information bits and parity bits;

determining, based on the modulation order and a second probability distribution associated with the second plurality of bits, a second scaling factor for constellation mapping the second plurality of bits; and mapping, based on the second scaling factor, the second plurality of bits to the one or more symbols.

26. The method of claim 20, further comprising:

receiving at least one of the modulation order, the probability distribution, and the at least one scaling factor from a network entity.

27. The method of claim 20, wherein the probability distribution is based on at least one of constant composition distribution matching (CCDM), multiset-partition distribution matching (MPDM), sphere shaping, and prefix-free code distribution matching (PCDM).

28. The method of claim 20, wherein the modulation order includes at least one of 16-quadrature amplitude modulation (QAM), 64-QAM, and 256-QAM.

29. A non-transitory computer-readable medium comprising at least one instruction for causing a computer or processor to:

obtain a first plurality of bits from a first buffer, wherein a start position for obtaining the first plurality of bits from the first buffer is based on a redundancy version order;

determine, based on a modulation order and a probability distribution associated with the first plurality of bits, at least one scaling factor for constellation mapping the first plurality of bits; and map, based on the at least one scaling factor, the first plurality of bits to one or more symbols.

30. The non-transitory computer-readable medium of claim 29, further comprising at least one instruction for causing the computer or processor to:

determine, based on the redundancy version order, that the start position for obtaining the first plurality of bits from the first buffer corresponds to an intermediate position in the first buffer;

determine that the first plurality of bits includes shaped information bits, non-shaped information bits, and parity bits, wherein the at least one scaling factor includes a first scaling factor and a second scaling factor;

determine the first scaling factor for constellation mapping the shaped information bits; and determine the second scaling factor for constellation mapping the non-shaped information bits and the parity bits.

* * * * *